United States Patent

Quiogue

[15] 3,696,353

[45] Oct. 3, 1972

[54] TIMING TRACK WITH DISCONTINUITY

[72] Inventor: Virgilio J. Quiogue, Plymouth, Mich.

[73] Assignee: Burroughs Corporation, Detroit, Mich.

[22] Filed: Aug. 4, 1971

[21] Appl. No.: 168,962

[52] U.S. Cl. ....................................... 340/174.1 A

[51] Int. Cl. ....................................... G11b 27/22

[58] Field of Search .340/174.1 A, 174.1 G, 174.1 H; 179/100.2 MI, 100.2 S

[56] References Cited

UNITED STATES PATENTS

| | | | |
|---|---|---|---|
| 2,903,677 | 9/1959 | Curtis | 340/174.1 A |
| 3,577,132 | 5/1971 | Anderson et al. | 340/174.1 A |
| 3,653,009 | 3/1972 | Krause | 340/174.1 A |

*Primary Examiner*—Vincent P. Canney
*Attorney*—Paul W. Fish et al.

[57] ABSTRACT

A method and circuit for deriving timing signal information required by present day rotating magnetic storage media from a single control track of N clock pulses, where the N Clock pulses are spaced in at least (N + 1) clock pulse periods or cycles, and where the trailing edge of each clock pulse coincides with the trailing edge of a pulse period or cycle. Conceptually, a comparison is continuously made between the time durations between the trailing edges of pairs of successive clock pulses and when the time durations differ by a predetermined amount, a sync pulse is generated corresponding to a pulse normally derived from a conventional sector track. A pulse train generator and a one-shot multivibrator employing an R-C timing network coordinated by a sync detection logic system are used to effect the comparison and generate the sync pulse.

11 Claims, 15 Drawing Figures

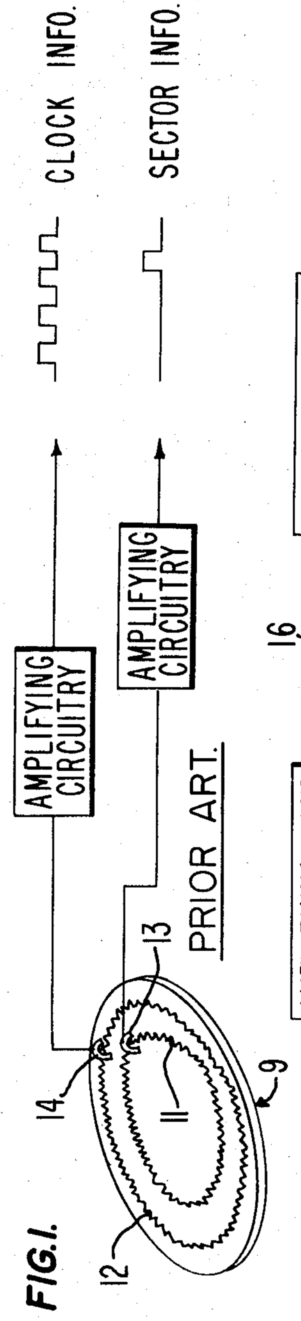
FIG.1.
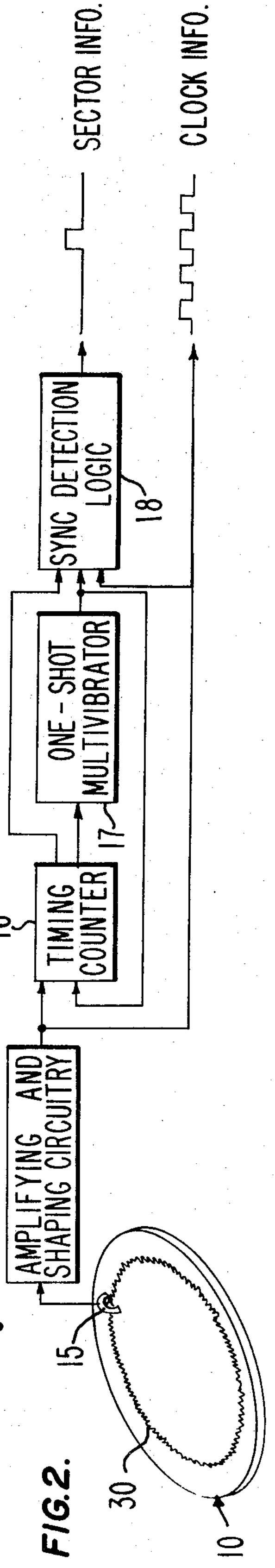
FIG.2.
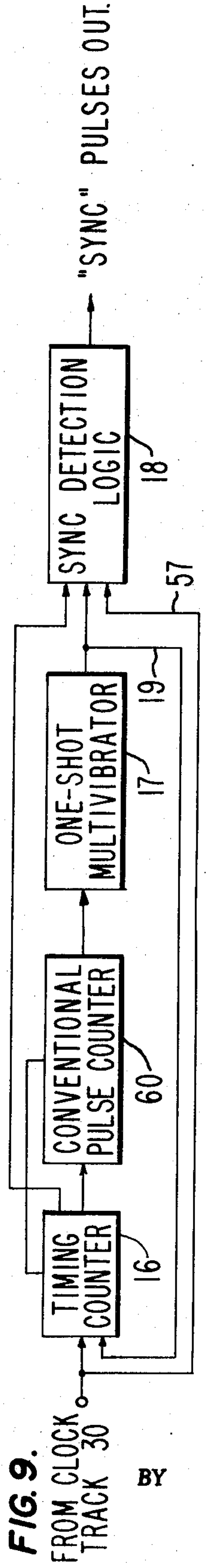
FIG.9.
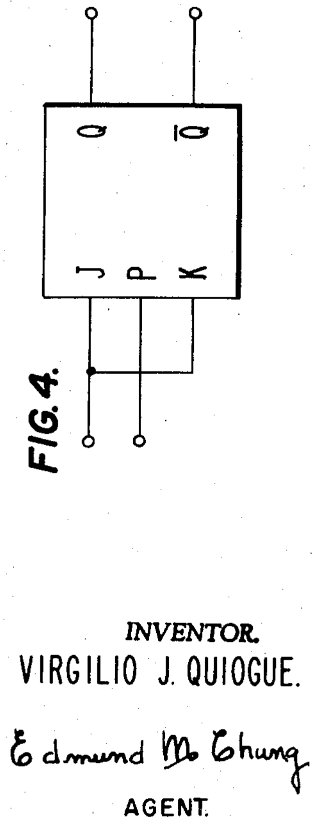
FIG.4.
| t | | t+1 | |
|---|---|---|---|
| $Q=1$, $\bar{Q}=0$ | $J=0$, $K=0$ | $Q=1$, $\bar{Q}=0$ | NO CHANGE |
| $Q=1$, $\bar{Q}=0$ | $J=1$, $K=1$ | $Q=0$, $\bar{Q}=1$ | CHANGE (COMPLEMENT) |
FIG.4A.
INVENTOR.
VIRGILIO J. QUIOGUE.
BY
Edmund M. Chung
AGENT.

FIG. 5.

| CLOCK PULSE (AT THE TRAILING EDGE) | FLIP-FLOP 20 | | | FLIP-FLOP 21 | | |
|---|---|---|---|---|---|---|
| | J-K | Q | $\overline{Q}$ | J-K | Q | $\overline{Q}$ |
| 0 | 0 | 1 | 0 | 1 | 1 | 0 |
| 1 | 1 | 1 | 0 | 1 | 0 | 1 |
| 2 | 1 | 0 | 1 | 0 | 1 | 0 |
| 3 | 0 | 1 | 0 | 1 | 1 | 0 |
| 4 | 1 | 1 | 0 | 1 | 0 | 1 |
| 5 | 1 | 0 | 1 | 0 | 1 | 0 |
| 6 | 0 | 1 | 0 | 1 | 1 | 0 |
| 7 | 1 | 1 | 0 | 1 | 0 | 1 |

FIG. 7.

| AT TRAILING EDGE OF CLOCK PULSES | FLIP-FLOP 20 | | | | FLIP-FLOP 21 | | | | |
|---|---|---|---|---|---|---|---|---|---|
| | J-K | Q | $\overline{Q}$ | D | J-K | Q | $\overline{Q}$ | G | $\overline{G}$ |
| 10 | 0 | 1 | 0 | 1 | 1 | 1 | 0 | 0 | 1 |
| 11 | 1 | 1 | 0 | 0 | 1 | 0 | 1 | 1 | 0 |
| 12 | 1 | 0 | 1 | 1 | 0 | 1 | 0 | 0 | 1 |
| 13 | 1 | 0 | 1 | 0 | 1 | 1 | 0 | 0 | 1 |
| 14 | 1 | 1 | 0 | 1 | 1 | 0 | 1 | 1 | 0 |
| 15 | 1 | 0 | 1 | 0 | 0 | 1 | 0 | 0 | 1 |

FIG. 6.
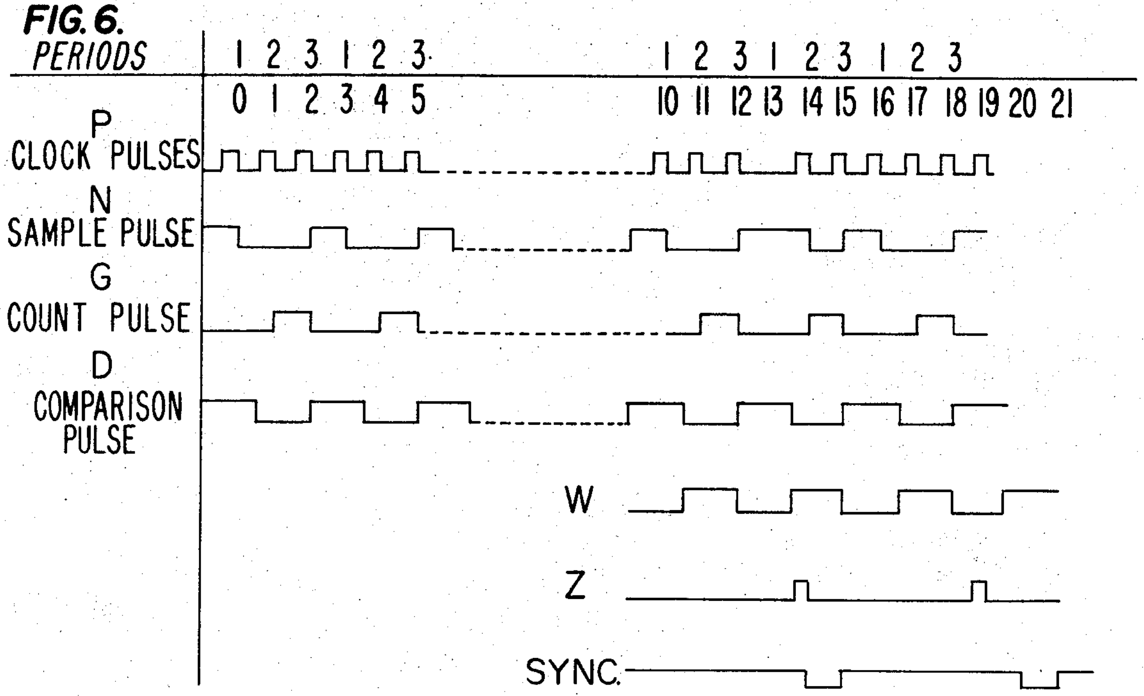
FIG. 8.
FIG. 8A. FIG. 8B. FIG. 8C. FIG. 8D. FIG. 8E.
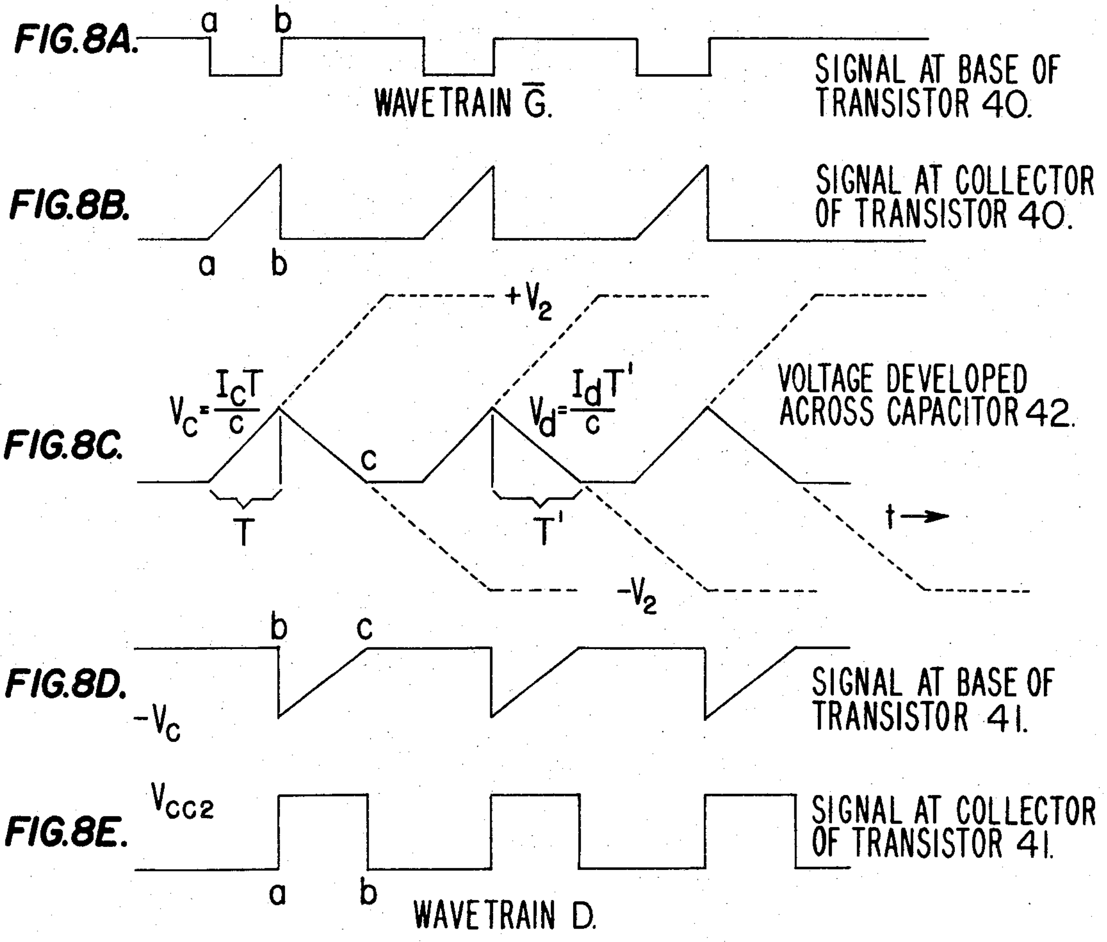

TIMING TRACK WITH DISCONTINUITY

BACKGROUND OF THE INVENTION

This invention finds application in the field of information storage and retrieval equipment and, more particularly, in the timing and addressing of rotating magnetic memory storage media.

In memory storage media, such as drums or disc files, information in the form of magnetically recorded impulses is stored on the drum or disc surfaces which are coated with a film or magnetic material. Each impulse stored in termed a "bit" of information, and thousands of these bits are recorded in information tracks on the surface of the storage medium. Such information, in the form of bits of data, may be recorded on the magnetic surface by a transducer positioned to magnetically coact with the moving surface. Similarly, to retrieve the stored information, the same transducer may be utilized to sense the flux distribution of the information bits stored on the surface of the magnetic medium. However, for such information to be useful when retrieved, the bit recording and reproducing circuits associated with the transducer must operate in synchronism with the movement of the surface of the storage medium, and a fixed reference with regard to the rotation of the storage medium must be established so that the location of stored information with respect to the fixed reference is known at all times. It is readily evident that without a fixed reference from which the location of stored information is determined, every bit of information stored in the memory medium would have to be retrieved each time a specific piece of information is desired.

Moreover, such information, to be intelligible when read back, must be grouped into characters, or a predetermined number of information bits. Such characters must further be grouped into words and finally, a predetermined number of words must be grouped into sectors.

Thus, it is common practice in rotating storage media to utilize a plurality of so-called control or clock tracks, which are also disposed on the surface of the storage medium, to control the timing of the transfer of information to and from the storage medium. The control or clock tracks generally provide individual timing or clock pluses associated with each discrete storage location (bit) within the respective information tracks of the storage medium, and further provide a clock pulse synchronized with each complete revolution of the storage medium. In some instances, a clock pulse is provided to signify the beginning and end of characters, words and sectors.

Presently, in data processing systems not employing self-clocking techniques but utilizing drum or disc storage media, a minimum of two control or clock tracks is required, one for generating a clock pulse for every information bit along an information track, and the other for generating a clock signal once per cycle of operation of the storage medium. A transducer associated with the first control track senses a permanently recorded magnetic pattern of the control track to generate a fluctuating or alternating signal, the frequency of which is established by the rotational speed of the storage medium and the corresponding linear speed of the control track. The information bits may be generated as pulses synchronized with the signal derived from the control track and selectively gated and passed to another transducer which would record the information bits at precise angular positions with respect to the control track. Similarly, the timed pulses may be used to control other circuits in the reproduction of previously recorded information bits.

With the increasingly common use of rotating magnetic files of the disc type for the storage of information in date processing systems, it is clear that reducing the number of control tracks associated with each disc to a single control track will have a marked effect on the information storage capability of the data processing system. In one embodiment of a memory disc in the prior art, the disc contains sixteen information tracks and two control tracks: a clock track for producing a timing pulse for every bit position along the information track, and a sector track for producing a timing signal once per revolution of operation of the memory disc.

If the timing signals for such a disc are confined to one control track, the information capability of the disc is increased by an additional track, or approximately 6 percent. In multiple disc systems, this increase in information storage capability is substantial. In addition, each of the aforementioned control tracks has associated therewith a reading head, bit detecting and amplifying circuits, and gating devices. This practice results, therefore, in an expensive system with considerable duplication of components and circuitry in order to identify correctly which portions of the recorded information are being read at any particular instant. Furthermore, this practice results in considerable difficulty in synchronizing signals in the various control tracks.

In the past, attempts have been made to confine to a single control track all the timing signals necessary for addressing and retrieving stored information. However, considerable difficulty was encountered in either establishing a fixed reference point which was synchronized with the rotation of the disc, or in generating timing signals which would automatically compensate for variations in the rotational speed of the disc due to mechanical jitter in the system or the effects of temperature fluctuations.

Accordingly, it is the primary object of this invention to derive all timing signals required on a rotating magnetic memory medium from a single control track.

Another object of this invention is to provide a method and means for generating timing pulses from a single control track which are synchronized with the rotation of a magnetic storage medium.

A further object of this invention is to provide a method and means for generating timing pulses from a single control track which are synchronized with the rotation of a magnetic storage medium even though the rotation of the storage medium may very in speed.

A still further object of this invention is to increase the information storage capability of rotating magnetic storage medium.

SUMMARY OF THE INVENTION

In achieving the objects of the invention, a single control track has recorded thereon N clock pulses in at least $(N + 1)$ equal clock pulse periods or cycles with the trailing edge of each clock pulse corresponding with the trailing edge of a clock pulse period or cycle, resulting in at least one discontinuity in terms of a clock pulse period. Conceptually, in carrying out the principle of the invention, a continuous comparison of the time durations between the trailing edges of two successive pairs of clock pulses is made and a sync or reference pulse generated if a difference of more than a predetermined amount in the time duration is found.

For the purposes of the timing system of the invention, the number of clock pulse periods, at least (N + 1), is artificially divided into small groups of the same number of pulse periods. The number of pulses periods per group may vary due to the variations in the total number of pulse periods in different media since all the pulse periods must be contained equally in the groups. In the preferred embodiment, a group contains three pulse periods with one discontinuity per revolution and during the start-up revolutions of the magnetic disc, the circuitry of the invention positions the discontinuity in the first pulse period of a group.

The waveform derived from the clock pulses of the control track containing the discontinuity is applied to a timing counter. The timing counter generates a sample pulse the length of which equals the time duration between the trailing edges of the last clock pulse of the preceding group, and the first clock pulse of the following group. If the group contains a discontinuity, the sample pulse measures the time from the trailing edge of the last clock pulse of the preceding group to the trailing edge of the pulse in the second clock period of the sample group. In addition, the counter generates a count pulse for each successive group of three pulse periods, each count pulse measuring the actual time duration between the trailing edges of the second and third pulses of the group. In terms of count and sample pulses, a group may be defined as commencing at the leading edge of a sample pulse and ending at the trailing edge of a count pulse.

The sample pulse is channeled directly to a sync detection circuit. The count pulse triggers a one-shot multivibrator which generates a pulse of constant relative value to the input, the length of the pulse being always more than the length of the input (count) pulse but less than the length of two input pulses. This one-shot output pulse, referred to hereinafter as the comparison pulse, is fed simultaneously to the sync detection circuitry and back to the timing counter, If there is a discontinuity in a group, the comparison pulse generated by the prior group and fed back to the timing counter initiates the first pulse of the group for purposes of generating a count pulse.

THe sync detection circuit, which also receives the clock pulse train from the control track, gates at the trailing edge of a clock pulse each sample pulse from the counter and each comparison pulse from the one-shot multivibrator. If the time duration of the sample pulse exceeds the time duration of the comparison pulse, a discontinuity exists and a sync pulse is generated.

Other objects, features and advantages of this invention will become apparent upon reading the following detailed description and referring to the accompanying drawing in which:

FIG. 1 is a block diagram of a data address timing system of the prior art;

FIG. 2 is a functional block diagram of a data address timing system embodying the features of this invention;

FIG. 4 is a block diagram of a bistable device used in FIG. 3;

Figure 3:
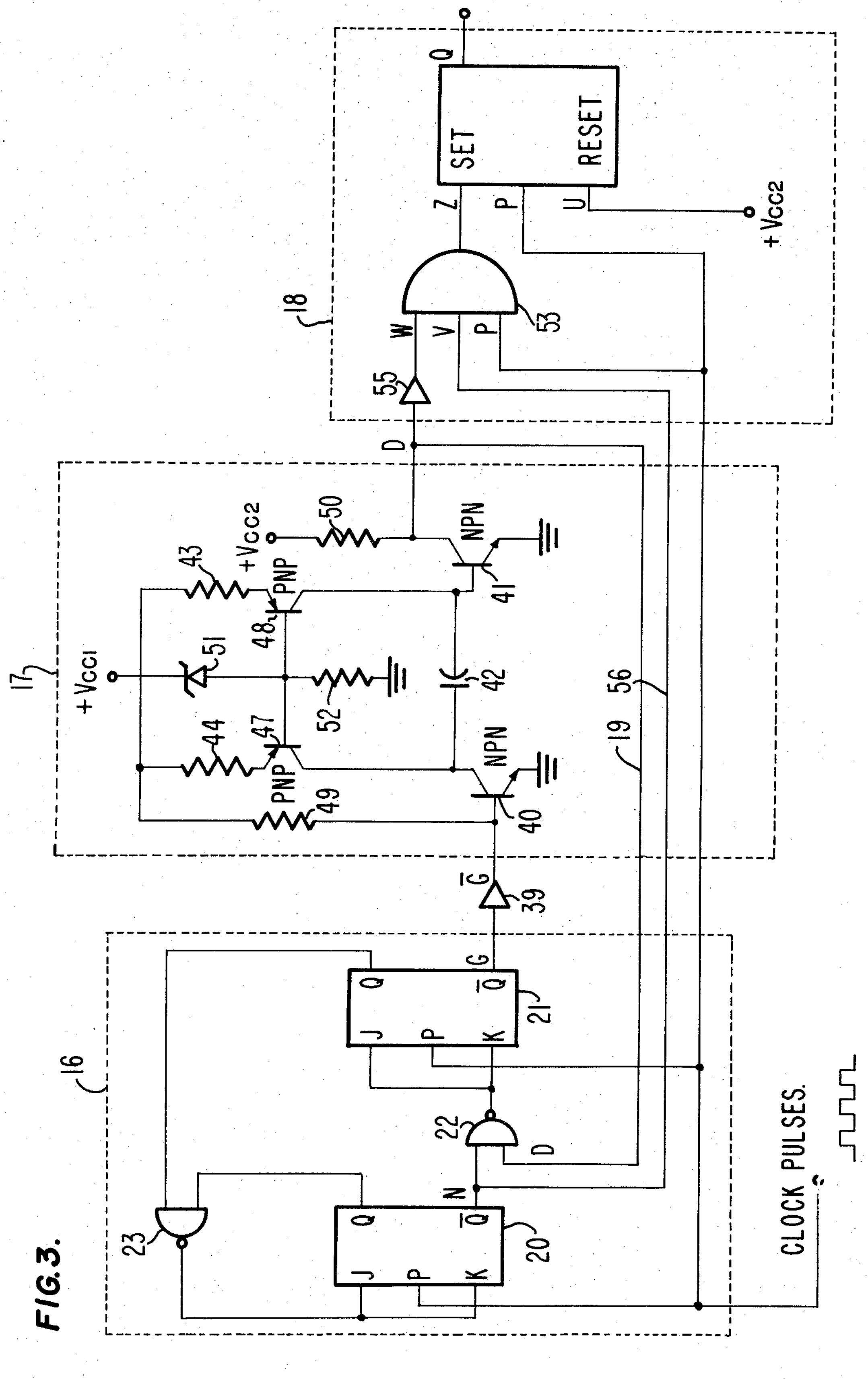
FIG. 3 is a circuit diagram of the timing system in accordance with the present invention.

FIG. 4*a* is a logic truth table for the device of FIG. 4;

FIG. 5 is a logic truth table for a timing counter of FIG. 3 excluding the effect of a discontinuity in the control track of FIG. 2;

FIG. 6 is a timing chart setting forth the waveforms in the timing system of the invention;

FIG. 7 is a logic truth table for the timing counter of FIG. 3 including feedback effects of the multivibrator also shown in FIG. 3;

FIG. 8*a* –*e* shows waveforms depicting the operation of the one-shot multivibrator circuit of the subject invention; and FIG. 9 is a modification of the timing counter of FIG. 3.

DESCRIPTION OF THE PREFERRED EMBODIMENT

The prior art (FIG. 1) utilized a magnetic disc 9 having a sector track 11 and a clock track 12, and transducers 13 and 14 for reading the sector and clock pulses, respectively. The clock track 12 of the prior art generated a wavetrain of serial pulses of equal duration and of equal periods and the sector track 11 generated a timing signal or pulse once per revolution of operation of the magnetic disc 9.

Under this invention (FIG. 2) a clock pulse waveform, capable of providing both clock and sector information, is derived form as single clock track 30 on a magnetic memory disc 10 by a transducer 15. Clock track 30 is permanently recorded on the memory disc 10 and in the preferred embodiment, will generate a consecutive chain of serial pulses except that there will be one discontinuity per revolution of the rotating memory disc 10 in terms of one pulse period. Therefore, if clock track 30 contains N clock pulses, there will be (N + 1) clock pulse periods, or cycles, per revolution of the memory disc 10. Such a wave-train of pulses is shown in FIG. 6 and identified as P.

The circuit of the invention generates a so-called "sync" pulse once per revolution of the memory disc 10. The sync pulse occurs when the discontinuity on the clock track 30 is detected by the circuit of the invention.

Conceptually, to detect a discontinuity in clock pulses for each revolution of the memory disc 10, the circuit of the invention continuously compares the time durations between the trailing edges of pairs of successive pulses of clock track 30. If the results of the comparison differ by a predetermined amount, a sync pulse will be generated which corresponds to the reference point on the rotating memory disc 10. A wavetrain of sync pulses generated by the circuit of the invention will correspond to a wavetrain of pulses derived from the sector track 11 of the prior art. Variations in the rotational speed do not affect the precise timing of the sync pulse.

In the preferred embodiment of the invention, the clock pulse waveform derived from clock track 30 on the magnetic disc 10 by transducer 15 and appropriate amplifying circuits is applied to a timing counter 16. Timing counter 16 generates a sample pulse for each group of three pulse periods, where the time duration of each sample pulse is equal to the actual time duration between the trailing edges of the last clock pulse of the preceding group and the first clock pulse of the following group.

In addition, the time counter 16 generates a count pulse for every three clock pulse periods applied, in which a sample pulse was generated where the time duration of each count pulse is equal to a pulse period of clock track 30. The count pulse is generated between the trailing edges of the second and third pulse periods for each group of three pulse periods. For the present, it may be helpful to visualize that for each successive group of three pulse periods, timing counter 16 generates a sample pulse which always commences at the leading edge of the first pulse period of the group, and a count pulse which always terminates at the trailing edge of the last or third pulse period of the group. Thus, in terms of sample and count pulses, the leading edge of a sample pulse coincides with the beginning of a pulse group, and the trailing edge of a count pulse coincides with the end of a pulse group.

Each count pulse is impressed upon a one-shot multivibrator 17, hereinafter described in detail, which generates a comparison pulse for each count pulse. The time duration of each comparison pulse is a direct function of the time duration of each count pulse, and the ratio of the time durations of the comparison pulse to the count pulse is a fixed constant. As will be described hereinafter, the leading edge of a comparison pulse also coincides with the leading edge of a pulse group.

Each comparison pulse generated by the one-shot 17 is then impressed upon a sync detection logic 18 which gates the clock pulse waveform P, each sample pulse generated by timing counter 16, and each comparison pulse generated by the one-shot 17. If, at the trailing edge of a clock pulse, the trailing edge of a sample pulse occurs after the trailing edge of the comparison pulse, the sync detection logic 18 will generate a sync pulse. At the trailing edge of the next clock pulse, the sync pulse will terminate. Thus, the circuit of the invention generates a sync pulse only when a discontinuity occurs on the clock track 30.

Turning now specifically to the various circuits s of the invention, timing counter 16 shown in FIG. 3 comprises two flip-flops 20, 21 and related gating. The bistable devices 20, 21 are standard JK flip-flops but connected for a particular operation in the counter 16 which is better understood by reference to FIGS. 4 and 4*a*. Each of the flip-flops 20, 21 has three input terminals J, K and P, the latter being the clock terminal. The two output terminals are designated Q and $\overline{Q}$, where $\overline{Q}$ has a signal that is the inverse of the signal appearing on terminal Q.

J-K flip-flops are complementary with operating characteristics as shown in the truth table set forth in FIG. 4a. The left hand column of FIG. 4a is the condition of the Q output terminal at a time ($t$) before the application of a clock pulse to the clock terminal of the flip-flop. The right hand column of FIG. 4*a* sets out the condition of the Q terminal after the clock pulse has been applied to the flip-flop at time ($t$+1) when the other two input terminals J and K have the binary input shown in the middle column. Only when both J and K input terminals are "true" or high, will the flip-flop change state as the clock input changes from a positive voltage (true) to zero volts. Thus, the bistable flip-flops of the counter 16 "complement" only when both the J and K input terminals are high at the trailing edge of an input clock pulse, the state of the flip-flop being immaterial.

With the designation and operation of the flip-flop in mind, the operation of the timing counter 16 of FIG. 3 can now be easily understood. Clock pulses read from clock track 30 on magnetic disc 10 are simultaneously inputted to the clock terminal P of first flip-flop 20 and second flip-flop 21. The $\overline{Q}$ output of flip-flop 20 is applied as an input N to a two input NAND gate 22 and the output of NAND gate 22 is connected in parallel to the J and K input terminals of flip-flop 21. Also applied as an input D to NAND gate 22, as feedback, is the output of the one-shot multivibrator 17. The Q outputs of flip-flops 20, 21 are inputted to a NAND gate 23 and the output of NAND gate 23 is parallelled to the J and K inputs of flip-flop 20. The output of the timing counter 16, which is inputted to the one-shot multivibrator 17, is taken from the $\overline{Q}$ output of flip-flop 21.

As will be understood from the structure of timing counter 16, one set of the tied-inputs to flip-flop 20 and to flip-flop 21 is always high. If, for example, the J-K inputs of flip-flop 20 are low, both inputs to the NAND gate 23 have to be high, i.e., the Q outputs of both flip-flops 20, 21 are high. With the Q output of flip-flop 20 high, the $\overline{Q}$ output N must be low. The output of NAND gate 22 is, therefore, high brining a high to the tied-inputs of flip-flop 21. On the other hand, if the J-K inputs to flip-flop 21 are low, both inputs to the NAND gate 22 must be high, necessitating that the Q output of flip-flop 20 be low. The output of NAND gate 23 and the J-K inputs of flip-flop 20 must, therefore, be high.

Assuming for the present purpose of analysis that the apparatus of the invention is interacting with a portion of the control track 20 where there is no discontinuity, a truth table for the counter 16 is shown in FIG. 5.

Again assuming, for purposes of illustration, that the J-K inputs of flip-flop 20 are low, with the concomitant high output on the Q terminal for both flip-flops 20, 21, then at the trailing edge of the first clock pulse, only flip-flop 21 will switch as required by table 4A. A pulse will thereby be instituted at the $\overline{Q}$ terminal of flip-flop 21. After switching, the J-K input terminals of flip-flop 21 remain high since the $\overline{Q}$ output terminal of flip-flop 20 remains low. However, the J-K terminals of flip-flop 20 go high since the Q terminal of flip-flop 21 is now low. At the trailing edge of the second clock pulse of the illustrative sequence both flip-flops 20, 21 switch since their J-K input terminals are high and a high will appear at the $\overline{Q}$ terminal of flip-flop 20, which is utilized as the sample pulse in the preferred embodiment. Since, as will be shown subsequently, a high appears on the feedback 19 from the multivibrator 17 concurrently with the high on the $\overline{Q}$ terminal of flip-flop 20 the J-K inputs to flip-flop 21 go low. At the trailing edge of the third clock pulse of the sequence, therefore, only flip-flop 20 switches since its J-K input terminals are high. The conditions present at the input and output terminals of flip-flops 20, 21 after the trailing edge of the third clock pulse are identical to the conditions present before the trailing edge of the first clock pulse, keeping in mind that a condition of no discontinuity was assumed.

When power is initially applied to the timing system of the invention, and before any clock pulses are sensed by transducer 15 from clock track 30, a low on both the Q terminals of flip-flops 20, 21 may exist. However, as is evident from an analysis of the truth table of FIG. 5 and the circuit of FIG. 3, the trailing edge of the first clock pulse sensed by transducer 15, both flip-flops 20, 21 will switch and the status as shown after the $0^{th}$ pulse in FIG. 5 will exist.

Note that a high or positive pulse was present at the $\overline{Q}$ terminal of flip-flop 21 only after the trailing edge of the first clock pulse (FIG. 5) of the illustrative sequence. Remembering that the input to the one-shot multivibrator 17 is taken from the $\overline{Q}$ terminals of flip-flop 21, it is now seen that the timing counter 16 generates a count pulse for every three clock pulses inputted, assuming that there is no discontinuity in the clock pulses.

As earlier mentioned, a graphic representation of clock pulses derived from clock track 30 is shown as wave-train P in FIG. 6. The first five pulses of the train P represent the situation where no discontinuity appears. Also included in FIG. 6 is a plurality of waveforms drawn for particular time segments. The alphabetical notation given to the left of each waveform corresponds to certain locations in the block diagram of FIG. 3, and identification of these waveforms will follow in the discussion hereinafter.

The one-shot multivibrator 17 has two switching transistors 40 and 41 of the NPN type. The collector of transistor 40 is connected to a positive voltage source $V_{CC1}$ through a current regulating device 47 and primary charging resistor 44. Similarly, the base of transistor 41 is connected to the positive voltage source $V_{CC1}$ through a current regulating device 48 and a primary discharging resistor 43. A timing capacitor 42 is connected between the collector of transistor 40 and the base of transistor 41. Resistors 43 and 44 and timing capacitor 42 comprise an R-C network for the one-shot multivibrator 17. The emitters of transistors 40 and 41 are grounded.

The count pulses from counter 16, forming wavetrain G of FIG. 6, are inputted to the base of transistor 40 through an inverter 39 as the trigger pulses for multivibrator 17. Output pulses of the one-shot 17, which form wavetrain D of FIG. 6, are taken from the collector of transistor 41. A resistor 49 connected between the base of transistor 41 and positive voltage source $V_{CC1}$, , and a resistor 50 connected between the collector of transistor 41 and a positive voltage source $+V_{CC2}$ are used to provide the proper biasing voltages for transistors 40 and 41, respectively.

Current regulating devices 47 and 48 are PNP transistors, and together with a zener diode 51, a resistor 52, and resistors 43, 44 serve to supply constant current to the operational portion of the one-shot 17. The emitter of PNP transistor 47 is connected to one end of the charging resistor 44, and the emitter of PNP transistor 48 is connected to one end of the discharging resistor 43. The bases of transistors 47 and 48 are shorted together, and the collector of transistor 47 is connected to the collector of transistor 40, while the collector of transistor 48 is connected to the base of transistor 41. The cathode electrode of zener diode 51 is connected to the positive voltage source $V_{CC1}$, and the anode electrode is connected to the shorted bases of PNP transistors 47 and 48. In addition, one end of resistor 52 is connected to the shorted bases of the two PNP transistors, and the free end of resistor 52 is grounded.

Resistor 52 and zener diode 51 maintain a constant negative potential with respect to $V_{CC1}$ at the bases of the PNP transistors 47 and 48. Thus, the base to emitter ($V_{be}$) potential of each PNP transistors 47, 48 is maintained at a substantially constant value. Similarly, the potential developed across the emitter coupled charging and discharging resistances 44 and 43, respectively, is maintained at a constant value, and the current, therefore, through each of the emitter coupled resistances is also constant. This arrangement also provides that the collector currents of the PNP transistors 47 and 48 are maintained at a substantially constant value.

In operation, inverted count pulses, which form wavetrain $\overline{G}$, FIG. 8a, are inputted to the base of transistor 40. When the pulses of wavetrain $\overline{G}$ are low, the emitter-base junction of transistor 40 is reversed biased, thus turning "off" transistor 40 and providing a charging path for timing capacitor 42 through charging resistor 44, current regulating device 47 and conducting transistor switch 41. The collector of transistor switch 40 rises from approximately ground potential towards a potential equal to the charge accumulating on timing capacitor 42, point a, FIG. 8b. When the charge on capacitor 42 approaches a value substantially equal to the potential at the base of current regulating device 47, further charging of the capacitor 42 is inhibited since current regulating device 47 will be in saturation. However, below the saturation point of transistor 47, only constant current is permitted to flow through charging resistor 44. Moreover, within this range of voltages in which capacitor 42 will charge before saturation is reached, charging of capacitor 42 occurs linearly, since the current flowing through charging resistor 44 is constant within this range, FIG. 8c. Assuming saturation of current regulating device 47 is not reached, then the time duration that capacitor 42 is allowed to charge is dependent upon the duration of the input pulse of wavetrain $\overline{G}$, which maintains transistor 40 in the "off" condition, while the rate of charging capacitor 42 is a function of the values of charging resistor 44 and timing capacitor 42. Employing the conventional formula for the charging of a capacitor with the modification for a constant current the potential developed across the timing capacitor 42 during charging may be expressed mathematically as:

$$V_c = I_c T / C \qquad (1)$$

where $I_c$ is the constant current flowing through the charging resistor 44 and timing capacitor 42; $T$ is the time duration of the inverted count pulses which form wavetrain $\overline{G}$; and C is the value of the time capacitor 42. It must be remembered that equation (1) is valid only while current regulating device 47 is not in saturation. This range is represented by the sloping portion of the linear charging curve of FIG. 8c.

When the inverted count pulses of wavetrain $\overline{G}$ go high, transistor 40 turns back "on," and the collector of transistor 40 falls to a potential approximately equal to ground, point b, FIG. 8*b*. Transistor 40 now provides a discharge path for the charged timing capacitor 42.

when capacitor 42 discharges, the plate of the capacitor connected to the base of transistor 41 switches negative and turns "off" transistor 41, point *b*, FIg. 8*d;* the emitter-base junction now being reversed-biased. Simultaneously, the collector potential of transistor 41 steps up to a potential approximately equal to the resistively coupled voltage source $+V_{CC2}$ of transistor 41, FIG. 8*e*. During the period that the charge on capacitor 42 reverse-biases the emitter-base junction of transistor switch 41, a discharging current is permitted to flow through discharge resistor 43, current regulating device 48 and now conducting transistor switch 40 for discharging capacitor 42.

The operation of current regulating device 48 is identical with the operation of current regulating device 47, and as previously described for current regulating device 47, the discharging of capacitor 42 will occur linearly until saturation of current regulating device 48 is reached.

Remembering that transistor switch 41 will turn back "on" as soon as the emitter-base junction is forward-biased, it is readily apparent that saturation of current-regulating device 48 will not be reached. The potential developed across the timing capacitor 42 during discharge is expressed mathematically as:

$$V_d = I_d T'/C \qquad (2)$$

where $I_d$ is the constant current flowing through the discharging resistor 43, current regulating device 48, capacitor 42, and transistor switch 40; $T'$ is the time duration of the discharge which is the time required for the emitter-base junction of transistor switch 41 to become forward-biased again; and C is the value of the timing capacitor 42.

During discharging, when the charge on the plate of capacitor 42 connected to the base of transistor 41 has reached substantially "ground" potential, point *c*, FIG. 8*d*, transistor 41 again turns "on" thereby dropping the collector potential of transistor 41 approximately to "-ground" again, point c, FIG. 8*e*.

Thus, the $\overline{Q}$ output pulses of flip-flop 21, which form wavetrain G, can be conceived as controlling the one-shot multivibrator 17 by ordering the one-shot to charge capacitor 42 when wavetrain G goes from a "low" level to a "high," and to discharge when wavetrain G goes from a "high" level to a "low" level.

A specific feature of the one-shot multivibrator 17 is that the time for charging and discharging the capacitor 42 is proportional to the resistive values of the emitter coupled charging and discharging resistances 44 and 43, respectively. This can be visualized mathematically as follows:

$$I_c = V_1/R_c \text{ and } I_d = V_2/R_d \qquad (3)$$

where $V_1$ and $V_2$ are the potentials developed across the charging and discharging resistances, respectively; $R_c$ is the ohmic value of the charging resistance 44; and $R_d$ is the ohmic value of the discharging resistance 43. Assuming negligible emitter-base voltage ($V_{eb}$) of the transistors 47, 48 are equal, and taking into account the operation of zener diode 51 and current regulating device 47, 48, and further assuming that the charge on capacitor 42 does not reach a level such that devices 47 or 48 are driven into saturation, then:

$$V_1 = V_2 \qquad (4)$$

and, therefore $$I_c R_c = I_d R_d \qquad (5)$$

Since the charge accumulated during charging must be equal to the reverse charge dissipated during the discharge, then in equations (1) and (2)

$$V_c = V_d \qquad (6)$$

and $$I_c T/C = I_d T'/C \qquad (7)$$

Rewriting equations (5) and (7), respectively $$I_c/I_d = R_d/R_c \qquad (8)$$

$$I_c/I_d = T'/T \qquad (9)$$

and combining equation (8) and (9), then:

$$T'/T = R_d/R_c \qquad (10)$$

Thus, a ratio of the discharge period to the charge period of capacitor 42 is equal to a ratio of the value of the discharging resistor 43 to the value of the charging resistor 44. Stated differently, a ratio of the time durations of the comparison pulse (the output of the multivibrator 17) to the count pulse is a constant which may be changed by varying the resistive values of the charging and discharging resistances 43 and 44, respectively, of the one-shot 17.

Returning now to the timing counter 16, the feedback effect of a comparison pulse generated by the one-shot multivibrator 17 will be considered. However, before doing so, a general understanding of the nature of the comparison pulse may provide helpful. In the preferred embodiment, the maximum time duration between the trailing edges of two successive clock pulses of clock track 30 cannot exceed two clock pulse periods in duration even if there is a discontinuity. Similarly, the minimum time duration between the trailing edges of two successive clock pulses must be least one clock pulse period in duration. Remembering from the previous discussion of the relationship of the sample and comparison pulses necessary for a discontinuity to be detected, it is obvious that the time duration of the comparison pulse (T') must be greater than one clock pulse period but less than two clock pulse periods in duration. If the time duration of the comparison pulse were greater than two clock pulse periods, then an analysis of FIG. 8 will reveal that capacitor 42 will not completely discharge before charging is again commenced, in which case equation (10) will no longer be applicable. If the comparison pulse were less than one clock period in duration, then at the trailing edge of a clock pulse the trailing edge of the sample pulse would always occur after the trailing edge of the comparison pulse, and a reference or sync would be generated for each comparison.

Moreover, from the above-discussion, the spatial relationship of the count and comparison pulses can be visualized. A count pulse is generated by timing counter 16 between the leading and trailing edges of the third pulse period of each group of pulse periods. Concurrent with the trailing edge of the third pulse period of each group, is the leading edge of a comparison pulse generated by the one-shot multivibrator 17. Therefore, the leading edge of a comparison pulse coincides with the leading edge of the sample pulse. The trailing edge of the comparison pulse will occur between the leading and trailing edges of the second pulse in the group of pulse periods subsequent to the group which generated the count pulse for triggering the generation of the comparison pulse. The actual location will depend upon the values of resistors 44 and 45 of the one-shot multivibrator 17. Thus, each count pulse generates a comparison for the next successive group of pulse periods.

To demonstrate now the feedback effect of a comparison pulse generated by one-shot 17, assume for purpose of analysis, that the output D of multivibrator 17, forming wavetrain D of FIG. 6, is always low. In this situation the $\overline{Q}$ output terminal G of flip-flop 21 of the timing counter 16 would change states at the trailing edge of every clock pulse since the output of NAND gate 22 would always be high, irrespective of the condition on the N input to NAND gate 22, which is the $\overline{Q}$ output of flip-flop 20. However, with the existence of a high on wavetrain D to the D input to NAND gate 22 coupled with a high on the N input, a low is caused to be inputted to the J and K input terminals of flip-flop 21, thereby inhibiting the complement of flip-flop 21, upon the trailing edge of a clock pulse at flip-flop 21. By proper selection of the parameters of resistors 43 and 44 of the one-shot multivibrator 17, a high on wavetrain D and a low at the N input to NAND gate 22, will not occur at the tailing edge of a clock pulse. Thus, whenever a comparison pulse is being generated by the one-shot 17, a high will always appear at the D input to NAND gate 22, and inhibit flip-flop 21 from complementing, which in turn prevents a count pulse from appearing at the $\overline{Q}$ terminal of flip-flop 21 until a comparison pulse is completely generated by the one-shot 17. Stated differently, a count pulse will not be generated while a comparison pulse is being generated.

In addition to inhibiting timing counter 16 from impressing another signal on the one-shot 17 until sufficient time has elapsed for the generation of a complete comparison pulse, the feedback of the comparison pulse maintains the rhythmic generations of count pulses by the counter 16 regardless of a discontinuity in the clock pulses.

A truth table for the timing counter 16 when the feedback effect of the one-shot 17 is included in shown in FIG. 7. Comparing this truth table with the truth table (FIG. 5) which does not include the feedback effect of the one-shot multivibrator 17, reveals that timing counter 16 generates a count pulse for each group to three clock periods, even though a discontinuity of clock pulses appears in the group. The truth table of FIG. 7 should be considered in conjunction with the waveforms of FIG. 6.

The pulses 10, 11 and 12 of pulse train P represent the uninterrupted pulse train starting with pulses 1–5, the conditions of the counter 16 being the same after the trailing edge of pulse 10 as was assumed at "0" in FIG. 5. The truth tables of FIG. 7 exactly parallels the table of FIG. 5 through pulses 12, (pulse 2 of FIG. 5), the third pulse of a pulse group, except that the effect of the length of the comparison pulse is reflected at the D input of NAND gate 22.

As previously explained, the sample pulse and the count pulse are normally the same length, but the comparison pulse is extended by a constant factor relative to the count pulse by the one-shot multivibrator 17. The comparison pulse, therefore, goes low between clock pulses but the effect is not impressed on the counter 16 until the trailing edge of the next clock pulse.

At the trailing edge of pulse 12 conditions are exactly the same as at the trailing edge of the second pulse in the development of the table of FIG. 5. The J-K inputs and the $\overline{Q}$ output of fliP-flop 20 are all high and both inputs of the NAND gate 22 are high. Consequently, the J-K inputs of flip-flop 21 are low.

However, a discontinuity appears in the first clock period of the next group which is represented graphically in the truth table of FIG. 7 and in pulse train P as 13. Since there is no clock pulse 13 flip-flop 20 cannot switch although its J-K inputs are high, and a high remains at its $\overline{Q}$ output. However, the comparison pulse goes low before the trailing edge the 14th pulse and the J-K inputs to flip-flop 21 consequently go high. At the trailing edge of clock pulse 14, therefore, the count pulse is generated at the $\overline{Q}$ output of flip-flop 21 as through FF 20 had complemented in the regular order. Thus, it can be seen that the feedback of the comparison pulse has the effect of simulating the trailing edge of a clock pulse when there is a discontinuity.

Since the J-K inputs of FF 20 remained high, FF 20 will also complement at the trailing edge of the 14th pulse. Since the Q output of FF 21 has gone low, the J-K inputs of FF 20 remain high and counter 16 has regained its normal sequence.

For all groups of pulse periods having no discontinuity, the feedback of the comparison pulse generated by the one-shot multivibrator 17 follows the $\overline{Q}$ output of flip-flop 20, at the trailing edge of each clock pulse. For these situations, timing counter 16 is performing as a clock pulse counter. However, in those situations where a discontinuity occurs, the feedback of the comparison pulse goes low before the trailing edge of the next pulse, placing a high on the J-K inputs to flip-flop 21 allowing the output terminal of flip-flop 21 to complement at the training edge of this next pulse. For groups having a discontinuity, this next or second pulse, is the last pulse in the group. Thus, with feedback from the one-shot 17, timing counter 16 will generate, at the trailing edge of the second clock pulse period, an output pulse for every group of three clock pulse periods. Viewed in another light, timing counter 16 divides the frequency of clock wavetrain P by three in the preferred embodiment.

A careful study of the $\overline{Q}$ output of flip-flop 20, which is summarized in the truth table of FIG. 7, and waveform N, FIG. 6, in conjunction with waveform P, which graphically represents the clock pulses derived from clock track 30, will reveal that the durations of the pulse generated by the $\overline{Q}$ output of flip-flop 20 represents the actual time duration between the trailing edges of the last clock pulse in the preceding group of three pulse periods and the first clock pulse in the following group of three pulse periods.

From the above, it can be seen that the timing counter 16 actually has two primary functions, namely (1) to produce a regular (count) pulse of sufficient duration for generating the comparison pulse, and (2) to generate a sample pulse, which represents the actual time duration between the trailing edges of the two successive clock pulses for comparison with a comparison pulse, generated by the one-shot multivibrator 17.

Moreover, the spatial relationship of the sample and comparison pulses may be visualized from the above discussion. Remembering that the leading edge of a comparison pulse coincides with the trailing edge of the last clock pulse of the preceding group it is now clear that the leading edge of the sample pulse also coincides with the leading edge of the comparison pulse. The trailing edge of the comparison pulse will always fall between the leading and trailing edges of the second pulse period in each group. The trailing edge of the sample pulse will always coincide with the trailing edge of the first pulse period in each group, except where there is a discontinuity. Where a discontinuity occurs, the trailing edge of the sample pulse will coincide with the trailing edge of the second pulse period of the group and will occur after the trailing edge of the comparison pulse.

Returning to the circuit of the invention, the sync detection logic circuitry 18 will be described. The logic circuit comprises a three input AND gate 53, the output of which is connected to a "set" terminal Z of a flip-flop 54. Generated comparison pulses from the one-shot multivibrator 17 are applied to a first input W of AND gate 53 through an inverter 55. The $\overline{Q}$ output of flip-flop 20 of the timing counter 16, wavetrain N, is applied to a second input V of AND gate 53 through line 56. Clock pulses from clock track 30 are simultaneously applied as inputs to the third input terminal P of AND gate 53 and the clock input terminal P of flip-flop 54. For consistency with the requirements of associated circuitry, the output of the sync detection logic is taken from the Q or "set" output terminal of flip-flop 54. The "reset" terminal of FF 54 is connected to a potential source $+V_{CC2}$.

Flip-flop 54 is a standard R-S trailing edge flip-flop connected so that an input pulse applied to the "set" input terminal produces a pulse at the set output terminal at the trailing edge of a clock pulse, which is applied to the clock terminal P of FF 54.

A pulse will appear at the "set" input terminal Z of FF 54 only when a high occurs simultaneously on the W, P and V input terminals to AND gate 53. Since the pulses appearing at the W terminal are inverted comparison pulses, the only situation in the preferred embodiment in which a sample pulse applied to terminal N of AND gate 53 is high while the corresponding comparison pulse is low, occurs when there is a discontinuity in clock track 30. In this situation, AND gate 53 will switch high at the leading edge of the first clock pulse after the discontinuity (pulse 14 of FIG. 7) causing the leading edge of a pulse to appear at the "set" input terminal Z of FF 54. FF 54 is now set, so that at the trailing edge of the same clock pulse, which is applied to the clock terminal P of FF 54, the Q or "set" output of FF 54 changes state (in the preferred embodiment, Q switches from low to high). Also at the trailing edge of the same clock pulse, the conditions present at the inputs to AND gate 53 produce a low at the "set" input terminal Z of FF 54, so that at the trailing edge of the next clock pulse, pulse 15 of FIG. 7, the Q or "set" output again changes state. No further switching of the Q or "set" output terminal of FF 54 will occur at the trailing edge of a clock pulse until a "set" pulse again appears at the input terminal Z of FF 54.

Thus, when an output pulse is produced by AND gate 53 and applied to the "set" input Z of flip-flop 54, an output or "sync" pulse (in this case a "high" ) will appear at the Q terminal of FF 54 at the trailing edge of the clock pulse. At the trailing edge of the next clock pulse, the "sync" pulse is discontinued, and flip-flop 54 reverts back to its original condition (in this case a "low" ).

An earlier examination of the sample pulses appearing at the $\overline{Q}$ output terminal of flip-flop 20, wavetrain N, revealed that the duration of the sample pulses present at this terminal represented the actual time duration between the trailing edge of the last clock pulse of the preceding group of pulse periods and the trailing edge of the first pulse in the following group. Since it is the time durations of these sample pulses which are compared with the time duration of the comparison pulses generated by the one-shot 17, it should be evident that when electric power is initially applied to the memory disc 10, more than one revolution of disc 10 may be required before the discontinuity is initially detected. The proper sample pulse for detecting the discontinuity will not be generated by the timing counter 16 until a sufficient number of revolutions of memory disc 10 have occurred to position the discontinuity as the first pulse period in a group. For example, suppose that when power is initially applied, the discontinuity falls within the second pulse period of the first group of these pulse periods sensed by transducer 15. Since a count pulse has not yet been generated by the counter 16, there is no comparison pulse fedback by the one-shot multivibrator 17. However, in the next group of three pulse periods timing counter 16 will generate a count pulse between the trailing edges of the first and second clock pulse of that group. The trailing edge of this count pulse marks the leading edge of the next group of pulse periods so that by the time the discontinuity is next sensed by transducer 15, the discontinuity is shifted one pulse period in that the discontinuity now falls within the third pulse period of that group. This process continues until the discontinuity is shifted so that it falls within the first pulse period of a group. For each revolution of the disc 10 thereafter, the proper occurrence of the comparison pulse and the sample pulse occurs and simulates the missing clock pulse.

In the preferred embodiment of the invention, clock track 30 contains 4557 pulse periods or cycles per revolution of magnetic disc 10. Because of the single discontinuity in terms of a pulse period per revolution of magnetic disc 10, there are only 4556 clock pulses spaced within the 4557 pulse period; moreover, the trailing edge of each of the 4556 pulses coincides with the trailing edge of one of the 4557 pulse periods or cycles. Timing counter 16 has been specifically designed and described so that after the initial start-up revolutions of the memory disc 10, a count pulse will be generated between the trailing edges of the second and third pulse periods of each group of three pulses periods, irrespective of whether there is a discontinuity or not.

Although it may appear that a restraint of this invention is that the frequency of the clock pulses read from clock track 30 must be evenly divisible by three, it should be obvious that other clock pulse schemes not divisible by three are easily adapted to the circuit of the invention. For instance, since it has been clearly described and demonstrated that after the start-up revolutions of the memory disc 10, the timing counter 16 of the preferred embodiment of the invention generates a count pulse between the trailing edges of the last two clock pulses in each group of three pulse periods, irrespective of whether there is a discontinuity or not, the $\overline{Q}$ output of flip-flop 21 could be utilized to set a conventional pulse counter 60 shown in FIG. 9. The conventional pulse counter 60 would be designed to count the additional clock pulses in excess of three and generate an output pulse (count pulse), the time duration of which always equals the time duration between the trailing edges of the last two clock pulses of a desired size group. The output pulses generated by the conventional pulse counter 60 would then be applied to the one-shot multivibrator 17 and as feedback to timing counter 16. As an alternative, a modified timing counter 16' could be designed so that after the start-up revolutions of the memory disc 10, the modified timing counter 16' would generate a sample pulse commencing at the leading edge of a group and a count pulse, the trailing edge of which coincides with the trailing edge of the desired size group. The time duration of the sample pulse would be designed to represent the time duration between the trailing edges of the last clock pulse of the preceding group and the first clock pulse of the following group, whereas the time duration of the count pulse would represent the time duration between the trailing edges of the last two pulses in the desired group.

As should be now evident, the number of pulse periods, at least (N + 1), of clock track 30 must be evenly divisible by a division factor F of the modified timing counter 16'. Expressed mathematically:

$$(N=1)/F = \text{any interger} \qquad (11)$$

Where ($N$ = 1 ) is the minimum number of clock pulse periods or cycles per revolution of memory disc 10. It is clear from equation (11) that F must be a mathematical factor of ($N$= 1).

Since the maximum number of start up revolutions required before a discontinuity may be detected is a function of the number of pulse periods in a group, it should be obvious that it is desiraBle to select a low mathematical factor F of ($N$= 1) greater than two.

The above relationship between the division factor F of modified timing counter 16'and the number of clock pulse N may be expressed mathematically as follows:

$$N = F(n+2) - 1 \qquad (12)$$

where $n$ is any interger; $N$ is the number of clock pulses per revolution of disc 10; and $F$ is the division factor of modified timing counter 16' greater than two. As corollaries of equation (12):

$$n = N+1/F - 2 \qquad (13)$$

$$F = N=1/n=2 = \text{always an interger} \qquad (14)$$

Therefore, in a system utilizing $N$ clock pulses, the number of clock pulse periods or cycles per revolution of memory disc 10 will be ($N$+1). The timing counter 16 is designed to divide the frequency of clock pulses per revolution of memory disc 10 by preferably a low mathematically factor of ($N$+ 1) greater than two. The values of resistor 43 and 44 of one-shot 17 would be selected so that a comparison pulse of time duration greater than one clock pulse period but less than two clock pulse periods in duration is generated.

There has thus been described a novel method and circuit for deriving all timing signals necessary for addressing and locating recorded information on rotating magnetic storage media. It is obvious that various other clock pulse schemes are possible in light of the above teaching. It is, therefore, to be understood that within the scope of the appended claims, the invention may be practiced other than as specifically described and illustrated.

What is claimed is:

1. A method for generating timed reference signals synchronized to the rotation of a magnetic storage medium from a single control track thereon, said track including clock pulses of equal periods and a discontinuity in length equal to the clock pulse period located between series of said clock pulses, comprising the steps of reading said clock pulses from said control track of said rotating storage medium, comparing the time durations between corresponding edges of pairs of successive ones of said clock pulses, and generating a reference pulse responsive to a variance resulting from said comparison.

2. The method of claim 1 wherein the steps of comparing includes the steps of grouping said clock pulses and discontinuity in a series of like numbers of period lengths said discontinuity occupying a predetermined position in a group, sampling each group as to the time duration from the trailing edge of the last pulse preceding said predetermined position and the trailing edge of the pulse in said predetermined position or the succeeding pulse of the discontinuity intervenes, measuring the time duration between the trailing edges of a pair of successive pulses following the predetermined location in each group, and testing the sampled time duration against the measured time duration.

3. The method of claim 2 wherein the steps of sampling and measuring both comprise generating pulses between the trailing edge of successive clock pulses and wherein the step of testing includes the step of extending the measuring pulse by a constant factor to generate a comparison pulse having a length greater than the measuring pulse but less than two measuring pulses.

4. The method of claim 3 further including the step of feeding back said comparison pulse for inhibiting the generation of a succeeding measuring pulse during the step of extending a measuring pulse.

5. A method for generating both clock pulses and a reference pulse per revolution of a magnetic storage medium from a single control track thereon, said reference pulse being synchronized with the revolution of said medium regardless of variations in the rotational velocity of the medium, comprising the steps of recording on said control track N clock pulses in (N + 1) equal pulse periods, the trailing edge of each of said clock pulses coinciding with the trailing edge of a pulse period, resulting in a discontinuity in the pulses as to one pulse period, reading said clock pulses from said control track of said rotating storage medium, continuously comparing the time duration between the trailing edges of pairs of successive clock pulses, and generating a reference pulse when the time duration of one of said pairs of successive pulses exceeds the other by at least a predetermined amount.

6. The method of claim 5, wherein the step of comparing includes the steps of grouping said pulse periods into not less than three periods per group, said discontinuity being located in the first period of a group, generating first, second and third pulses for each of said groups, each generated first pulse having a length equal to the time duration between the trailing edges of the last clock pulse of the preceding group and the first clock pulse of said group, each generating second pulse having a length equal to the time duration between the trailing edges of the pulses in the second and third periods of said group, each of said generated third pulses having a length greater than said second generated pulse, but less than two generated second pulses, and testing said length of said first generated pulse against said length of said third generated pulse.

7. The method of clam 6 including the step of feeding back said third generated pulse for inhibiting the generation of said second generated pulse during the generation of said third generated pulse.

8. An apparatus for generating timed synchronizing pulses from a rotating storage medium regardless of variations in the rotational velocity in said medium comprising a timing control track on said medium having recorded therein N clock pulses in (N + 1) equal pulse periods, resulting in a discontinuity in said pulses, means for reading said recorded clock pulses on said control track, means for precisely identifying the location of the discontinuity in the train of the read pulses, and means responsive to said identifying means for generating a reference pulse synchronized with a revolution of said magnetic storage medium.

9. The apparatus of claim 8 wherein said identifying means includes means for comparing the time duration between like edges of pairs of successive ones of said clock pulses.

10. The apparatus of claim 8 wherein said identifying means includes means for dividing said pulse periods into groups of equal numbers of at least three equal periods, said discontinuity having a predetermined position in a group, means for generating first and second pulses for each of said group from like edges of successive clock pulses, said first generated pulse being initiated by the clock pulse immediately preceding said predetermined position, and said second generated pulse being initiated by the clock pulse immediately following said predetermined position, and means for comparing said first generated pulses of one group with said second generated pulse of the preceding group.

11. The apparatus of claim 10 wherein said comparing means includes means for generating a delayed pulse having a predetermined ratio in length to said second generated pulse, said delayed pulse being longer than said second generated pulse and less than the length of two said second generated pulses.

* * * * *

UNITED STATES PATENT OFFICE
CERTIFICATE OF CORRECTION

Patent No. 3,696,353 Dated October 3, 1972

Inventor(s) Virgilio J. Quiogue

It is certified that error appears in the above-identified patent and that said Letters Patent are hereby corrected as shown below:

Column 1, line 10, "or" should be --of--; line 47, "pluses" should be --pulses--; Column 2, line 9, "date" should be --data--; line 58, "very" should be --vary--; Column 3, line 12, "pulses" second occurrence should be --pulse--; line 49, comma (,) should be period (.); line 54, "THe" should be --The--: Column 5, line 48, "circuits s of" should be --circuits of--. Column 6, line 9, "flip-flop" should be --flip-flops--; Column 9, line 6, "when" should be --When--; Column 10, line 15, "$I_c I/C=I_d T'/C$" should be --$I_c T/C=I_d T'/C$--; line 37 "provide" should be --prove--; Column 11, line 50, "in" should be --is--; line 64, "pulses" should be --pulse--; Column 12, line 12, "fliP" should be --flip--; line 26, "through" should be --though--; Column 15, lines 44, 45, "(N=1)" should be --(N+1)--; lines 48, 53, "(N=1)" should be --(N+1)--; line 52, "desiraBle" should be --desirable--; line 64, "n=N+1/F-2" should be --n=(N+1)F-2--; line 66, "F=N=1/n=2" should be --F=(N+1)/(n+2)--; Column 16, line 34, "steps" should be --step--; Column 17, line 33, "clam" should be --claim--; Column 18, line 3, "therein" should be --thereon--.

Signed and sealed this 1st day of May 1973.

(SEAL)
Attest:

EDWARD M.FLETCHER,JR.
Attesting Officer

ROBERT GOTTSCHALK
Commissioner of Patents